Jan. 18, 1966     A. WALZ     3,230,291
ELECTRIC FURNACE

Filed April 24, 1963     3 Sheets-Sheet 1

INVENTOR.
Alfred Walz
BY
Michael J. Striker

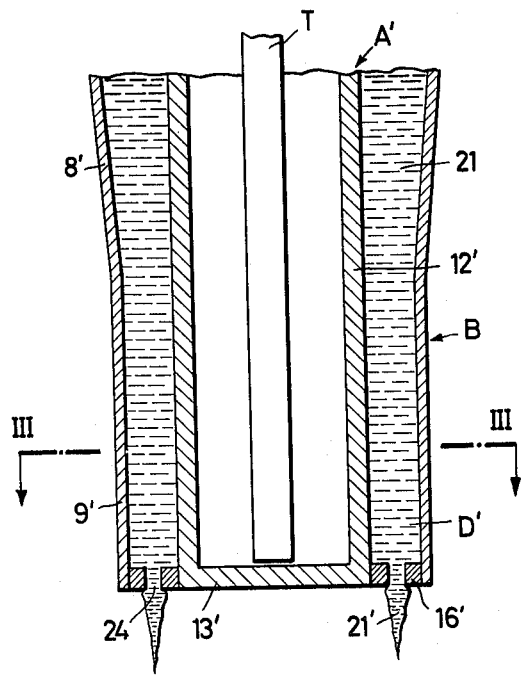
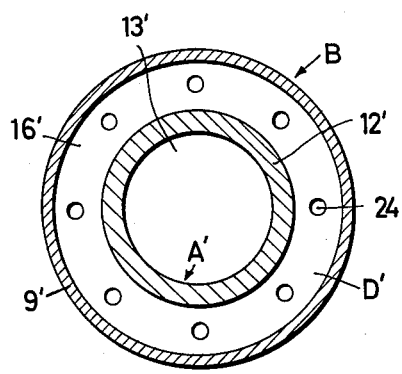

Jan. 18, 1966    A. WALZ    3,230,291
ELECTRIC FURNACE
Filed April 24, 1963    3 Sheets-Sheet 3

INVENTOR.
Alfred Walz
BY
Michael J. Striker

United States Patent Office 3,230,291
Patented Jan. 18, 1966

3,230,291
ELECTRIC FURNACE
Alfred Walz, am Kurzarm 7, Emmendingen,
Baden, Germany
Filed Apr. 24, 1963, Ser. No. 275,394
19 Claims. (Cl. 13—6)

The present invention relates to electric furnaces in general, and more particularly to an electric furnace which is especially suited for melting of glass, minerals and similar materials by direct resistance heating.

Still more particularly, the invention relates to a furnace which may be used in the production of filaments consisting of vitreous materials and the like and which is then utilized for delivering a continuous supply of molten material to the filament-forming apparatus.

Heretofore, it was considered necessary to maintain all or nearly all sections of an electric glass melting furnace at a temperature which equals or exceeds the melting temperature of the charge. Such operation entails considerable losses in heat energy and necessitates the provision of large vessels, crucibles or shells made of expensive heat-resistant material, such as platinum, platinum alloys and other precious metals. Furthermore, comparatively long intervals of time are necessary to adjust such conventional furnaces if the temperature of the charge rises above or drops below a predetermined temperature.

Accordingly, it is an important object of the present invention to provide a very simple and comparatively inexpensive electric furnace which operates with minimal heat losses, wherein only certain sections must be maintained at elevated temperatures, which can be adjusted instantaneously or with minimal losses in time if the temperature of the charge deviates from a predetermined optimal temperature, whose operation is fully-automatic, and which may be rapidly and conveniently converted for melting of different types of materials.

Another object of the invention is to provide a method of melting a charge of comminuted material of vitreous, mineral or other origin in a novel way so that the melting operation may be carried out in a small area, with little loss in heat energy, and on a continuous basis.

A further object of the invention is to provide an electric furnace which is constructed and assembled in such a way that heated but still solid or partially solid particles of the charge cannot adhere to the component parts of the furnace so that the likelihood of clogging is reduced to a minimum and that the output of the furnace may remain unchanged for practically unlimited periods of time.

An additional object of the invention is to provide an electric furnace of the just outlined characteristics wherein the regulation of feed of starting material and/or the regulation of temperatures prevailing in the actual melting zone may be effected in a fully automatic way.

Still another object of the invention is to provide an electric furnace only a small portion of which must be made of expensive material so that the overall cost of the furnace is reduced well below the cost of conventional furnaces with the same output without in any way affecting the durability and the effectiveness of the apparatus.

Another object of the invention is to provide an electric furnace for direct resistance heating of vitreous, mineral and similar materials which is constructed and assembled in such a way that the temperature of the melt is not affected by the much lower temperature of starting material regardless of whether such starting material (e.g., particles of glass, mineral rock or the like) is admitted intermittently or on a continuous basis.

With the above objects in view, one feature of the invention resides in the provision of an electric furnace which is especially suited for melting of glass, minerals and similar materials by direct resistance heating. The furnace comprises a first substantially vertical conductor, a second substantially vertical conductor which defines with the first conductor a preferably annular material-receiving chamber and whose lower portion is conductively connected with the lower portion of the first conductor, one or more outlets provided at the lower ends of the conductors and communicating with the material-receiving chamber, and electrodes connected with the conductors at a level above the lower portions thereof. In accordance with the invention, the thickness of at least one of the lower portions is reduced to such an extent that the material entering that zone of the material-receiving chamber which extends between the lower portions of the conductors is heated to melting temperature and is free to flow through the outlets. The remainder of the material-receiving chamber is used for preheating of the charge and for conveying preheated material by gravity feed to the aforementioned zone.

The improved method comprises the steps of conveying the material by gravity feed in a substantially vertical path, gradually heating the material in an upper zone of the path to a temperature below the melting point of the material, and heating the thus preheated material to melting temperature in a lower zone of the path. The length of this lower zone need not exceed and may be less than one-fifth of the overall length of the path. As a rule, the path is preferably an annular path so that the material may be heated by direct resistance heating from the inside and from the outside while it is being conveyed through the upper and lower zones of its path.

The novel features which are considered as characteristic of the invention are set forth in particular in the appended claims. The improved furnace itself, however, both as to its construction and its method of operation, together with additional features and advantages thereof, will be best understood from the following detailed description of certain specific embodiments with reference to the accompanying drawings, in which:

FIG. 2 is a central vertical section through the lower part of a modified furnace;

FIG. 3 is a horizontal section as seen in the direction of arrows from the line III—III of FIG. 2;

Figure 1:
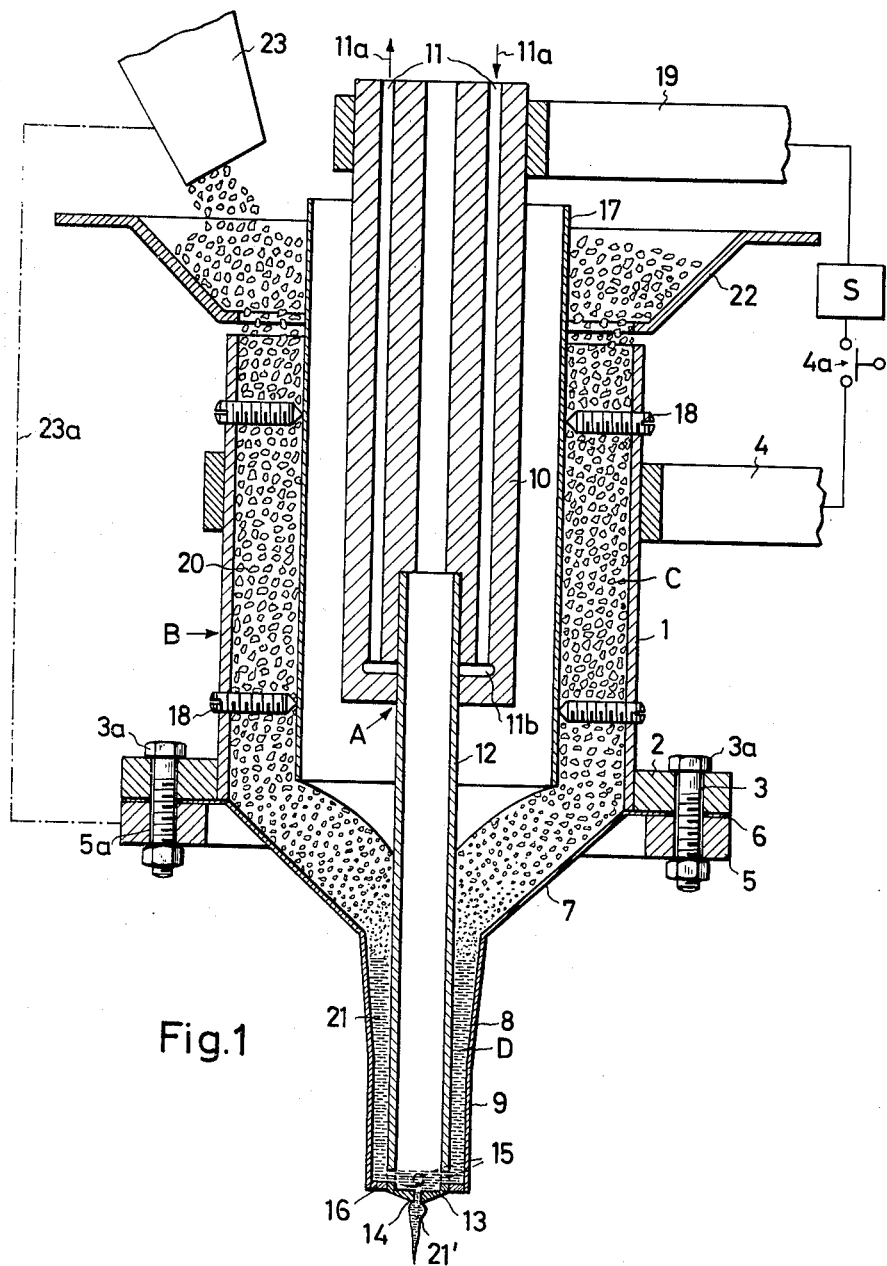
FIG. 1 is a central vertical section through an electric furnace which embodies one form of the invention.

Referring now in greater detail to the drawings, and first to FIG. 1, there is shown an electric furnace which is utilized for melting of comminuted glass, minerals (rock) and similar materials by direct resistance heating. This furnace comprises a vertical or nearly vertical inner tubular conductor A and a second or outer tubular conductor or shell B which surrounds the inner conductor and which is concentric therewith so that the two conductors define between themselves an annular material-receiving chamber C.

The conductor B has a cylindrical upper portion 1 whose upper end is open and whose lower end is secured to or integral with an outwardly extending annular flange 2 having equidistant axially extending bores 3 for bolts, rivets, screws or like fastening members 3a which serve to secure the flange to an annular support 5. The fastening members 3a extend through bores 5a which are aligned with the bores 3. The conductor B further comprises a conical intermediate portion 7 whose cross section diminishes in a direction away from the uper portion 1 and whose upper part assumes the form of an outwardly projecting annular extension or flange 6 which is sealingly received between the flange 2 and the annular support 5. It will be noted that the extension 6 is formed with openings which register with the bores 3, 5a so that the portions 1 and 7 are sealingly connected to each other when the fastening members 3a are fixed in position.

The upper portion 1 is connected with an electrode 4 which is connected in circuit with a suitable source S of electrical energy. The conductor B further comprises a lower portion which includes a slender conical upper section 8 extending downwardly from the intermediate portion 7, and a cylindrical lower section 9 which extends downwardly from the section 8 and whose lower end is sealed by a ring 16 of conductive material. It will be noted that the wall thickness of the lower portion 8, 9 is less than the thickness of the upper portion 1; in some instances, it is further advisable to make the lower portion 8, 9 thinner than the intermediate portion 7.

The inner conductor A comprises an upper portion 10 which assumes the form of a thick-walled cylinder and which is provided with internal cooling means here shown as axially parallel channels 11 arranged to permit circulation of water, air, steam or another suitable coolant in directions indicated by the arrows 11a. The lower ends of the channels 11 are in communication through an annular passage 11b which is machined into the upper portion 10 at a point close to the lower end thereof.

The lower portion of the conductor A assumes the form of a cylinder 12 whose upper end is telescoped into the lower part of the upper portion 10 and whose lower end is sealed by an end wall 13 having a centrally located outlet 14 which serves to discharge a stream 21' of molten material 21 from the lower zone D of the chamber C, i.e., from that zone which is defined by the lower portions 8, 9 and 12 of the conductors. The parts 13, 16 together constitute a bottom wall which conducts current between the conductors A, B and which also defines the aforementioned central outlet 14 for escape of molten material from the melting zone D.

An intermediate tube or shield 17 surrounds the upper portion 10 of the inner conductor A to protect this conductor from excessive heat. As shown, the shield 17 is adjustable axially of the conductors A, B upon loosening of retaining screws or bolts 18 which extend through and inwardly of the upper portion 1. Thus, the lower end of the shield 17 may be moved nearer to or further away from the intermediate portion 7 in order to regulate the flow of material 20 from that portion of the chamber C which is bounded by the parts 1 and 17.

The upper portion 10 of the inner conductor A is connected in circuit with the electrode 4 and with the outer conductor B by means of a second electrode 19 which is shown above the upper end of the shield 17. A feeding means, here shown as a chute 23, discharges material into a hopper 22 which surrounds the shield 17 and which conveys the material into the upper part of the chamber C, i.e., into that part of the chamber which surrounds the shield 17. When the circuit of the conductors A, B is completed (see the switch 4a), the conductors are heated and exchange heat with the material 20. In the zone D, the temperature of the material 20 is raised to the melting point so that the resulting melt 21 flows through radial ducts 15 provided in the lower portion 12 and is free to escape through the outlet 14 in the form of a thin stream 21'. The stream 21' may be drawn into fibers in accordance with any one of known methods not forming part of this invention.

FIGS. 2 and 3 illustrate the lower part of a slightly different electric furnace wherein the lower end of the lower portion 8', 9' forming part of an outer conductor B' is sealed by a ring-shaped conductor 16' which is formed with a series of equidistant outlets 24 each of which may discharge a stream 21' of molten glass 21 or the like. The inner conductor A' comprises a lower portion 12' whose lower end is sealed by an end wall 13' which is coplanar with the ring 16' and which constitutes with this ring a composite bottom wall for the conductors A', B'. It goes without saying that the number of outlets 24 may be changed and that one or more additional outlets may be provided in the end wall 13' without departing from the spirit of this invention. It will be noted that the wall thickness of the lower portion 8', 9' is less than that of the lower portion 12'. The melting zone D' of the annular chamber defined by the conductors A', B' is comparatively short and normally need not exceed about one-fifth of the overall length of the chamber. The same applies to the furnace of FIG. 1, i.e., molten material 21 is obtained only in that zone which is immediately adjacent to the bottom wall 13, 16 or 13', 16' of the furnace.

Figure 4:
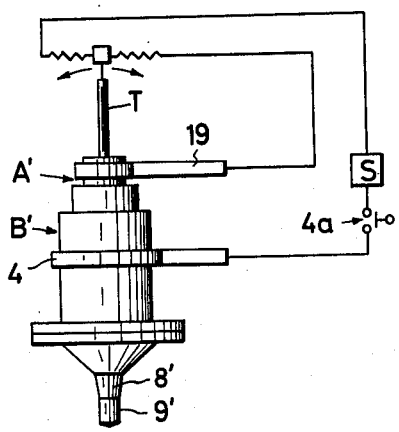
FIG. 4 is a schematic diagram of an electric circuit which maintains the temperature of the melt at a constant value.

A measuring device, here shown as a thermocouple T, is introduced into the interior of the inner conductor A' and extends into close proximity of the bottom wall 13', 16' to serve as a means for measuring the temperature of the melt 21. This thermocouple forms part of an electronic regulator which adjusts the temperature of the lower conductor portions in accordance with the measured result (i.e., in acordance with the temperature of the melt 21) in a fully automatic way, for example, in a manner as shown in FIG. 4. The thermocouple T controls the voltage between the conductors A', B' practically without any delay and insures that the temperature of the melt 21 in the melting zone D or D' of the material-receiving chamber is maintained at a constant value.

The improved furnace is operated as follows:

When the circuit of the electrodes 4, 19 is completed, current flows through the conductors A, B or A', B' so that the conductors are heated and cause the material 20 to melt in the zone D or D'. Heating of the conductors depends upon the electric resistance, i.e., on the specific resistance of materials used in making the conductors, on the length of the various portions of the conductors, and upon the reciprocal value of the cross section. In accordance with the present invention, the cross section (thickness) of the conductors A, B or A', B' decreases toward the lower ends thereof so that the charge of comminuted material 20 is heated to melting temperature only at the time it enters the lower portion 8, 9 or 8', 9' of the respective outer conductor. The temperature prevailing in the upper portion 1 and in the intermediate portion 7 increases hyperbolically in a direction toward the lower portion.

Figure 5:
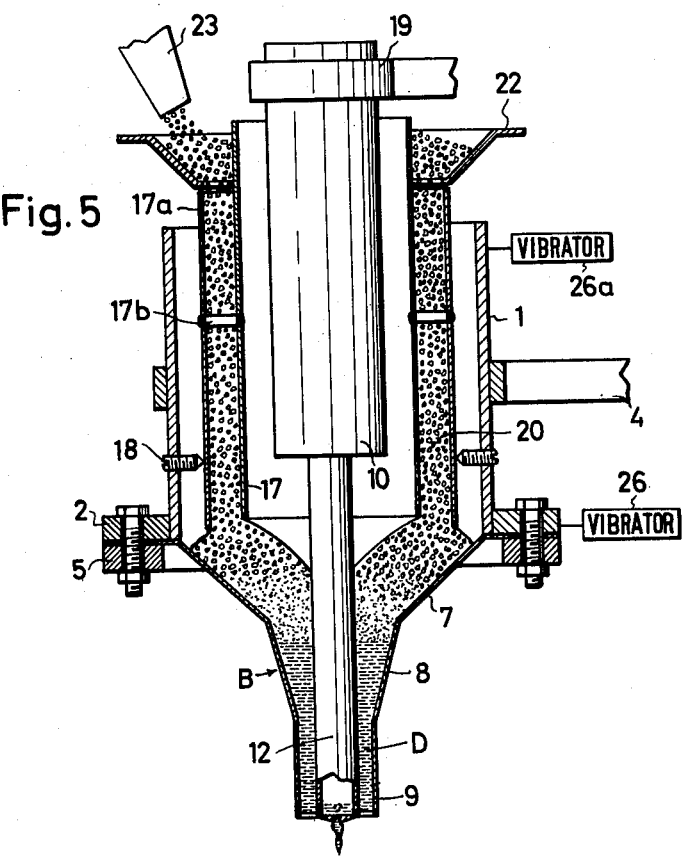
FIG. 5 is a vertical section through a further furnace wherein the upper portion of each conductor is protected against heat by a tubular shield and wherein the shields and one of the conductors are caused to vibrate when the furnace is in actual use.

The shield 17 insures that the material 20 may come into contact with the inner conductor A or A' only at a time when it is heated to melting temperature so that the material will not stick to the inner conductor. As a rule, the temperature of a part or of the entire inner conductor is sufficiently high to cause the material to sinter but is too low to cause melting of the charge excepting along the lower portion 12 or 12'. As shown in FIG. 5, the furnace may comprise two tubular shields 17, 17a the latter of which protects the upper portion 1 of the outer conductor B against direct contact with granular or comminuted material. In this embodiment of the invention, the material only comes into contact with the lower part of each conductor so that it cannot adhere to such parts of the conductors which are not heated to melting temperature of the charge. The outer shield 17a is adjustably supported by the upper portion 1 (see the bolts 18), and the inner shield 17 is carried by the outer shield through the intermediary of distancing members 17b.

In order to promote gravitational descent of material 20 into the melting zone D, the furnace may be equipped with one or more vibrators in a manner as shown in in FIG. 5 which illustrates a first vibrator 26 connected with the flange 2 to vibrate the outer conductor B, and a second vibrator 26a which shakes the shields 17, 17a.

Similar vibrators may be used in the furnace of FIG. 1 or 2. As explained hereinabove, the shield 17 or the shields 17, 17a will be adjusted in a way to insure that the charge 20 will reach such portions of the inner conductor and/or the outer conductor which are heated at least to the melting temperature of the charge. It is to be noted that the cooling system 11 of FIG. 1 may be omitted when the upper portion of the inner conductor A or A' is protected by a shield 17, i.e., the shield 17 may be used in addition to or as a substitute for the cooling system.

Owing to the provision of the cooling system 11 and/or the shield or shields 17, 17a, the cooler upper portions of the conductors may be manufactured of high-grade stainless steel, copper, graphite or the like. The lower parts are normally manufactured of precious metals such as platinum, platinum alloys and similar metallic substances.

Furthermore, at least the hotter portions of the conductors are protected by suitable thermal insulation, such as a ceramic material or a radiation reflecting insulating substance, not shown. Owing to the fact that only small portions of the furnace must be heated to temperatures (up to and exceeding 1500° C.) which equal or exceed the melting temperature of the charge, heat losses are minimal. In addition, since the furnace normally assumes the form of an elongated body, heat radiated from the hotter portions is used for preheating the charge in the cooler portions. Tests carried out with a furnace which embodies the present invention have shown that the energy required to produce 1 kg. of molten material amounts to less than 1 kwh. (860.3 kcal.).

Since the ration of total area of heating surfaces to the mass of the melt (21) is very favorable, i.e., since the thickness of the melt between the heating surfaces of the lower portions 8, 9–12 or 8', 9'–12' is comparatively small, temperature adjustments may be carried out with little loss in time.

Two or more furnaces may be connected in parallel to form a chain of furnaces and each individual furnace may be adjusted separately in a full automatic way by an arrangement of the type shown in FIG. 5 or by an equivalent arrangement.

Finally, it is advisable to provide means for automatically regulating the feed of material 20 into the chamber between the conductors A and B. For example, and as shown in FIG. 1, the support 5 may constitute a component part of a weight-responsive regulator which is operatively connected with the feeding means 23 by a connection 23a of any known design so as to shut off the delivery of material when the weight of the furnace exceeds a given value and to permit admission of additional material as soon as the overall weight of the furnace drops to below such predetermined value. Automatic regulation of feed may be effected in a number of other ways, for example, in dependency on the level of the melt 21 in the zone D.

The following example is given as illustrative only without, however, limiting the invention to the specific details of the example.

*Example*

The inner conductor A has a length of 250 mm. Its part 10 having a length of 145 mm., an outer diameter of 40 mm. and an inner diameter of 8 mm., is cooled by circulating water through passages 11a, 11b in a manner, the lowest parts of portion 10 assuming a temperature between 300 and 600° C. The lower part 12 has an outer diameter of 15 and an inner diameter of 11 mm. The upper part 10 was made of V2A-steel, the lower part 12 consists of a platinum alloy. One outlet 14 was provided having a diameter of 1.4 mm. The portion 1 of the outer conductor B, having an outer diameter of 100 mm. and a wall thickness of 2 mm., was made of V2A-steel. The lowest portion 9 of conductor B has an outer diameter of 23 mm. and a wall thickness of 1 mm. Melting material: Natural occurring marl.

Voltage between electrodes 4 and 19: 1.5 volts. Current strength: 800 amperes. About 5 minutes after actuating switch 4a the melted marl leaves the outlet 14 continuously in an amount of ca. 25 g./min. respectively 1.5 kg./hour, i.e., the efficiency was 0.8 kwh. per one kg. of the melt. The temperature of the melt was 1480° C. About 75 mm. above the outlet 14 a temperature of ca. 1400° C. was measured.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An electric furnace, particularly for melting of glass, minerals and similar materials by direct resistance heating, comprising a first substantially vertical conductor; a second substantially vertical conductor adjacent to said first conductor and defining therewith a material-receiving chamber, said conductors having lower portions conductively connected to each other and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with said first and second conductors at a level above said lower portions thereof.

2. An electric furnace, particularly for melting of glass, minerals and similar materials by direct resistance heating, comprising a substantially vertical inner conductor, a tubular outer conductor surrounding said inner conductor and defining therewith a material-receiving chamber, said conductors having lower portions conductively connected to each other and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with said first and second conductors at a level above said lower portions thereof.

3. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having lower portions conductively connected to each other at their lower ends and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with said first and second conductors at a level above said lower portions thereof.

4. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions; bottom wall means conductively connecting said lower portions and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with the upper portions of said first and second conductors.

5. An electric furnace as set forth in claim 4, wherein the cross section of said one lower portion diminishes directly above and in a direction toward said bottom wall means so that the material is heated to melting temperature in a zone whose volume is a small fraction of the total volume of said material-receiving chamber.

6. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions; bottom wall means conductively connecting said lower potrions and defining an outlet which communicates with said chamber, the thickness of the lower portions of said second conductor being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with the upper portions of said first and second conductors.

7. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions; bottom wall means conductively connecting said lower portions and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet, the axial length of said one lower portion approximating substantially one-fifth of the overall axial length of the respective conductor; and first and second electrode means respectively connected with the upper portions of said first and second conductors.

8. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions and at least said lower portions consisting of a material selected from the group consisting of platinum and platinum alloys; bottom wall means conductively connecting said lower portions and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with the upper portions of said first and second conductors.

9. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions consisting of a material selected from the group consisting of high-grade steel, copper and graphite and each conductor further comprising a lower portion; bottom wall means conductively connecting said lower portions and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with the upper portions of said first and second conductors.

10. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions; bottom wall means conductively connecting said lower portions and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; cooling means provided in the upper portion of said first conductor; and first and second electrode means respectively connected with the upper portions of said first and second conductors.

11. An electric furnace, particularly for melting of glass, minerals and similar materials by direct resistance heating, comprising a first and a second substantially vertical tubular conductor, said second conductor concentrically surrounding and being spaced from said first conductor and each of said conductors having an upper portion and a lower portion; a tubular shield disposed between the upper portions of said conductors and defining with said second conductor an annular material-receiving chamber, said lower portions defining between themselves a material-receiving zone which constitutes a downward extension of said chamber; bottom wall means conductively connecting said lower portions and defining an outlet which communicates with said zone, the thickness of at least one of said lower portions being less than the thickness of the remainder of the respective conductor so that the material entering said zone is heated to melting temperature when a current is caused to flow through said conductors and the resulting melt is then free to escape through said outlet; and first and second electrode means respectively connected with the upper portions of said first and second conductors.

12. An electric furnace as set forth in claim 11, wherein said shield is adjustable in the axial direction of said conductors and further comprising retaining means for supporting said shield in selected positions of axial adjustment with respect to said conductors.

13. An electric furnace as set forth in claim 11, wherein said outer conductor comprises an intermediate portion whose diameter diminishes in a direction from the upper toward the lower portion of said second conductor, said shield having a lower end terminating substantially at the level of and being spaced from said intermediate portion so that material admitted from above into said chamber may descend by gravity between said intermediate portion and said shield to accumulate in the zone between the lower portions of said conductors.

14. An electric furnace, particularly for melting of glass, minerals and similar materials by direct resistance heating, comprising a first substantially vertical conductor; a second substantially vertical conductor adjacent to said first conductor and defining therewith a material-receiving chamber, said conductors having lower portions conductively connected to each other and defining an outlet which communicates with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; means for vibrating at least one of said conductors so as to promote movement of material into said zone of the material-receiving chamber; and first and second electrode means respectively connected with said first and second conductors at a level above said lower portions thereof.

15. An electric furnace, particularly for melting of glass, minerals and similar materials by direct resistance heating, comprising a first and a second substantially vertical tubular conductor, said second conductor concentrically surrounding and being spaced from said first conductor and each of said conductors having an upper portion and a lower portion; a tubular shield disposed between the upper portions of said conductors and defining with said second conductor an annular material-receiving chamber, said lower portions defining between themselves a material-receiving zone which constitutes a downward extension of said chamber; bottom wall means conductively connecting said lower portions and defining an outlet which communicates with said zone, the thickness of at least one of said lower portions being less than the thickness of the remainder of the respective conductor so that the material entering said zone is heated to melting temperature when a current is caused to flow through said conductors and the resulting melt is then free to escape through said outlet; means for vibrating said shield so as to promote movement of material through said chamber and into said zone; and first and second electrode means respectively connected with the upper portions of said first and second conductors.

16. An electric furnace, particularly for melting of glass, minerals and similar materials by direct resistance heating, comprising a first substantially vertical conductor; a tubular second conductor surrounding said first conductor and defining therewith an annular material-receiving chamber, said conductors having upper portions and lower portions and each of said lower portions having a lower end; annular bottom wall means conductively connecting said lower portions and defining a plurality of equidistant outlets which communicate with said chamber, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlets; and first and second electrode means respectively connected with the upper portions of said first and second conductors.

17. An electric furnace, particularly for melting of glass, minerals and similar materials by direct resistance heating, comprising a first and a second substantially vertical tubular conductor, said second conductor concentrically surrounding said first conductor and defining therewith an annular material-receiving chamber, said conductors having upper portions and lower portions and each of said lower portions having a lower end, the lower portion of said first conductor having radial duct means in the proximity of said lower end thereof; bottom wall means conductively connecting said lower portions and sealing the lower end of said first conductor, said bottom wall means having a centrally located outlet which communicates with said chamber through said duct means, the thickness of at least one of said lower portions being less than the thickness of the remainder of the respective conductor so that the material entering that zone of said chamber which extends between said lower portions is heated to melting temperature when a current is caused to flow through said conductors and the resulting melt is then free to escape through said outlet; and first and second electrode means respectively connected with the upper portions of said first and second conductors.

18. An electric furnace, particularly for melting of glass, minerals and similar materials by direct resistance heating, comprising a first and a second substantially vertical tubular conductor, said second conductor surrounding and being spaced from said first conductor and each of said conductors having an upper portion and a lower portion; a pair of concentric tubular shields disposed between the upper portions of said conductors and defining between themselves an annular material-receiving chamber, said lower portions defining between themselves a material-receiving zone which constitutes a downward extension of said chamber; bottom wall means conductively connecting said lower portions and defining an outlet which communicates with said zone, the thickness of at least one of said lower portions being less than the thickness of the remainder of the respective conductor so that the material entering said zone is heated to melting temperature when a current is caused to flow through said conductors and the resulting melt is then free to escape through said outlet; and first and second electrode means respectively connected with the upper portions of said first and second conductors.

19. A furnace as set forth in claim 18, further comprising means for vibrating at least one of said shields.

References Cited by the Examiner
UNITED STATES PATENTS

| | | | |
|---|---|---|---|
| 2,600,490 | 6/1952 | De Voe | 13—34 |
| 2,680,772 | 6/1954 | Skinner et al. | 13—34 |
| 2,913,509 | 11/1959 | Pinotti | 13—6 |
| 3,109,045 | 10/1963 | Silverman | 13—6 |

RICHARD M. WOOD, *Primary Examiner.*

JOSEPH V. TRUHE, *Examiner.*